Feb. 28, 1933.   J. Q. DU PONT   1,899,235
FLUID FLOW CONTROLLING MECHANISM
Filed May 20, 1930
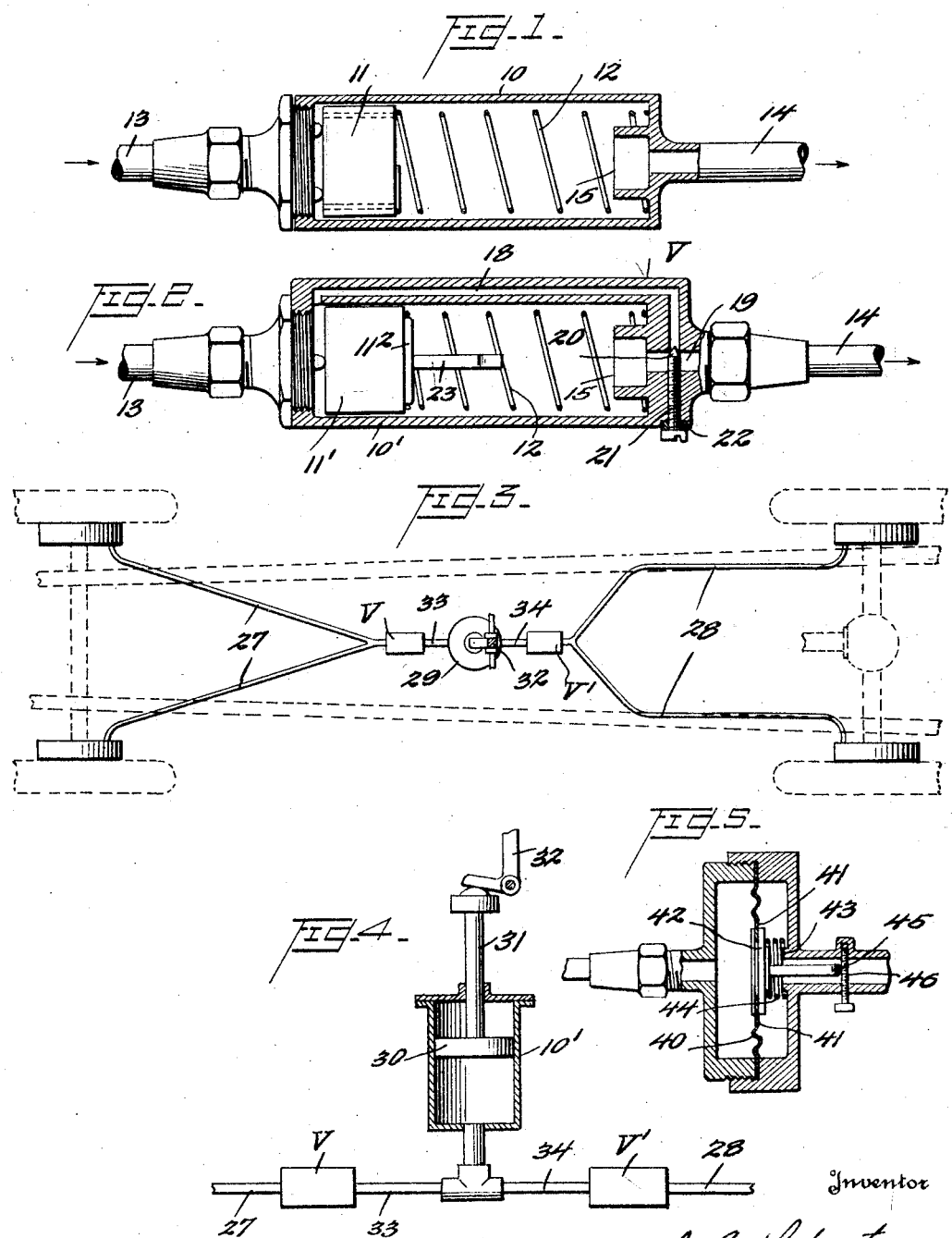
Inventor
J. Q. Dupont,
By Watson, Coit, Morse & Grindle
Attorneys Patented Feb. 28, 1933

1,899,235

UNITED STATES PATENT OFFICE

JAMES Q. DU PONT, OF JOHNSTOWN, PENNSYLVANIA

FLUID FLOW CONTROLLING MECHANISM

Application filed May 20, 1930. Serial No. 454,129.

This invention relates to fluid flow controlling mechanism and particularly to mechanism for automatically reducing or wholly interrupting a continuous or alternating flow of fluid upon the occurrence of a break in the fluid transmission system.

The invention has for its object the provision, in this connection, of a simple and effective automatically operating valve mechanism of general utility but particularly of value in combination with a hydraulic brake system for motor vehicles. In the usual four-wheel hydraulic brake systems, the fluid conduits leading to the respective brake-actuating mechanisms communicate with each other, generally through the common fluid pressure and supply chamber, so that, in the event that a leak develops in one of the conduits, fluid will be drained from all, thereby rendering the entire brake system inoperative. In accordance with the present invention, means is inserted in each of the fluid conduits leading to a brake unit which is effective to interrupt the flow through any conduit in which a break or leak develops, so that waste of fluid from the system is prevented and the danger of the entire braking system being rendered inoperative, obviated. Preferably the two pairs of conduits leading, respectively, to the front and rear wheel brakes are so arranged that a common cut-off valve is effective to cut out both conduits should a leak develop in either, thereby avoiding the possible bad results of having the brake of one wheel applied while the brake of the companion wheel is not.

Certain embodiments of the invention are illustrated in the accompanying drawing, in which:

Figure 1 is a longitudinal sectional view through a simple form of valve embodying the invention;

Figure 2 is a similar view showing the valve in combination with certain auxiliary parts;

Figure 3 is a plan outline of portion of a motor vehicle having a four-wheel hydraulic brake system provided with valves constructed according to the invention;

Figure 4 is a section of a detail of the brake system; and

Figure 5 is a longitudinal section through a modified form of valve.

In Figure 1 a simple form of the automatic valve is illustrated, the numeral 10 indicating a cylinder and 11 a piston therein. The piston may be biased by a spring 12 to a position adjacent one end of the cylinder, as shown. Fluid is adapted to flow into and out of the cylinder through pipes 13 and 14, which form members of a piping system in which fluid is adapted to flow in the direction of the arrows. The cylinder at its opposite end is formed with a seat 15 which is engaged by the piston when the latter moves to that end of the cylinder, in which event the piston serves as a cut-off valve preventing further flow through the conduit.

Assuming that it is desired to limit the quantity of fluid flowing in the system to a certain volume, the volume displaced by the piston in moving from the position shown to the position where it engages the valve seat 15 will be made equal to this desired volume of flow. Obviously, if there is no leakage of fluid past the piston, when the predetermined volume of fluid has flowed past any point of the system, the piston will have moved to engage seat 15, thereby interrupting the flow.

If it be desired to limit the flow to a predetermined rate, provision will be made to permit a flow past the piston of sufficient volume to produce the desired rate of flow. This may be done by providing a clearance between the piston and cylinder wall, by the provision of holes or grooves around the outer edge of the piston, or by providing a by-pass around the piston adjustable to effect any desired rate of flow. With the valve device thus constructed or adjusted to permit a given rate of flow, if this rate should be exceeded, the piston will move toward the right-hand end of the cylinder and engage seat 15, stopping further flow. If it is desired to adapt the valve for use in a system having a positively impelled alternating flow, the cylinder, of course, may be provided with a seat at both ends, and the piston may preferably be biased by springs to a position at the mid-point of the cylinder. However, where the device is used to limit a pure alternating flow of fluid (without leakage around the piston in either direction), there is little need of a spring except in the case where the device is so placed that gravity cannot return the piston or unless the alternation or pulsation is so high as to cause a lag or out-of-step effect due to the inertia of the piston. It will also be understood that various other changes and modifications may be made in the device as described and illustrated without departing from the scope of the invention as defined in the claims.

In Figure 2 the simple form of valve above described is shown in combination with certain auxiliary elements. The construction shown in this figure provides an adjustable by-pass around the piston valve, means for draining the system of fluid, such as air, gas, etc., and a safety latch adapted to hold the piston valve in closed position until manually released. Cylinder 10' is formed with a longitudinal passage 18 opening at one end into the rear end of the cylinder back of piston 11' and opening at its other end into a passage 19 which communicates with pipe 14. Passage 18 is adapted to be closed or to be opened to any desired degree by a needle valve 20 having a stem 21 threaded into a transverse aperture within the front end of the cylinder and extending across passage 19, a bushing 22 being provided to effect a liquid-tight joint between the head of valve stem 21 and the surface of the cylinder. Piston 11' carries on its front end a yielding facing $11^2$ of rubber, or other suitable material, adapted to engage valve seat 15, and also carries at this end an axially projecting spring latch 23 adapted, when the piston has moved to the front end of the cylinder, to snap over the valve stem 21 and hold the piston with its yieldable facing $11^2$ engaged with seat 15.

When the needle valve 20 closes by-pass 18, fluid flowing in the system in the direction of the arrows will cause piston 11' to move towards the right-hand end of the cylinder, and, when the volume of flow past any point reaches the volume displaced by the piston in its movement to the right-hand end of the cylinder, the yielding facing $11^2$ will engage seat 15 and stop further flow, spring latch 23 snapping over valve stem 21 and locking the piston. The valve will permit any desired rate of flow by adjusting the needle valve in accordance with the rate desired and/or by perforating the piston. Piston 11' can be returned to its initial position by unscrewing valve stem 21 until latch 23 is disengaged. This will also fully open by-pass 18, equalizing the pressure on opposite ends of the piston and permitting spring 12 to return the piston. To drain the system of fluid, such as air, gas, etc., it is only necessary to remove the valve stem 21 entirely.

The application of a valve embodying the invention to a four-wheel hydraulic brake system is shown in Figures 3 and 4. These figures show in a somewhat diagrammatic way a piping system for the brake actuating fluid. Conduits 27, 27 and 28, 28 lead, respectively, to the front and rear wheel brakes. These conduits communicate with a cylinder 29 having a piston 30 provided with a rod 31 which is adapted to be depressed for applying the brakes by a pedal operated lever 32. As shown, conduits 27 unite with a pipe 33 communicating with the bottom of cylinder 29, and conduits 28 unite with a pipe 34 also connected to the bottom of the cylinder. In the pipes 33 and 34 are inserted valves V and V', respectively, which may be constructed as shown in Figure 2.

If a leak should develop in either of the pipes 27 leading to the front wheel brakes, piston 11' of valve V would shut off the connection between both pipes and the pipe 33 connected to cylinder 29 after a predetermined leakage has occurred, thus cutting out the front wheel brakes and preventing leakage of fluid from the pipes 28 leading to the rear wheel brakes and from the cylinder 29, so that the rear wheel brakes would still be operative. Similarly, if a leak should develop in either of the pipes 28, the rear wheel brakes would be cut out, but the front wheel brakes would be operative. A valve device could of course, be inserted in each of the pipes 27 and 28, but in such case a leak in one of the pipes would result in rendering only the particular brake connected to that pipe inoperative, leaving the companion wheel brake operative. As this might result in a tendency of the car to swerve upon application of the brakes, it is, therefore, preferred to have both of the front wheel brakes controlled by a single valve device and to have both of the rear wheel brakes controlled by a single independent valve device.

When using the valve device illustrated by Figure 2 for controlling the flow of fluid in the conduits of a hydraulic brake mechanism, the by-pass 18 would, of course, be entirely closed by needle valve 20 under normal conditions. The feature of the lock for holding the piston in position to shut off the conduit in which a leak has occurred is of value as it positively holds the yieldable face $11^2$ of the piston against seat 15 and thereby prevents leakage of oil past the piston from draining the system, it not being essential, therefore, to provide a very close fit between the piston and cylinder. When it is desired to release the piston and recharge the repaired conduit with fluid, the valve stem 21 is unscrewed, opening the by-pass, and releasing the piston. Or whenever it is necessary to bring the piston back to its normal position from any position to which it has moved because of small leakage or evaporation of oil in the conduits and brake actuating motors, the by-pass can be opened to effect this result.

It will be understood, of course, that in the ordinary operation of the motor vehicle the brakes are only intermittently operated and that the fluid in the system is only intermittently placed under pressure, so that the several valve pistons in turn are only occasionally urged toward the outlet ends of their respective cylinders. So long as no leak develops in the system, the several valves merely move forwardly in their respective cylinders, stopping before coming into contact with the valve seats and returning when the pressure of the fluid is relieved. They therefore merely move forwardly and backwardly idly with the braking fluid, in the normal case, offering very little opposition to fluid flow in either direction. It is only when there is an excessive flow, due to a break or the like, that the piston moves to such extent as to act as a cut-off valve, in the manner heretofore described.

In Figure 5 a diaphragm type of valve is illustrated. Here the two halves of the cylinder clamp between them a diaphragm 40. Formed in diaphragm 40 is a number of small holes 41, and mounted centrally upon the same is a valve disc 42, adapted to seat upon valve seat 43 when the diaphragm is flexed materially toward the right (Figure 5). A light spring 44 normally returns the diaphragm to central position, but, in the event that a considerable unbalanced pressure upon the diaphragm causes seating of the valve 42, a latch 45 hooks over a catch 46 so that the valve is secured in seated position. By removing the catch 46, which in this instance is a screw, the latch can be released.

While I have described the valve as particularly useful in connection with motor vehicle braking systems, it will be apparent that it is a device of general utility and may be used in many combinations in the industrial arts. It may in fact be employed wherever it is desired to decrease or shut off flow through a conduit in any case where there is an abnormal increase in the velocity of flow therethrough or an abnormal increase in volume of flow.

Having thus described the invention, what is claimed as new and desired to be secured by Letters Patent is:

1. In combination with an hydraulic braking system for motor vehicles including a conduit connected at one end to the brake operating motor associated with one of the wheels of the vehicle and at its other end to the cylinder of the pedal operated piston, a valve connected in said conduit adjacent said cylinder, said valve comprising a cylinder and a piston therein, the cylinder being provided with a seat at one end adapted to be engaged by the piston to stop the flow of fluid in said conduit, a by-pass around said piston, a needle valve normally closing said by-pass having a stem screwed into said cylinder at said end, said piston having a spring latch adapted to engage said stem to hold the piston against said seat.

2. A valve including a cylinder adapted for insertion in a piping system for conveying fluid, the cylinder being provided with pipe connections at its two ends respectively, a piston in said cylinder, a spring normally holding said piston adjacent one end of the cylinder, a seat surrounding the opening in the other end of the cylinder adapted to be engaged by the piston, a by-pass around the piston, a needle valve screwed in said other end of the cylinder controlling said by-pass, the stem of the needle valve extending across the opening into the cylinder at this end, and a spring latch carried by the piston adapted to engage said stem when the piston engages said seat.

3. A valve including a cylinder adapted for insertion in a piping system for conveying fluid, the cylinder being provided with pipe connections at its two ends respectively, a piston in said cylinder, a spring normally holding said piston adjacent one end of the cylinder, a seat surrounding the opening in the other end of the cylinder, the piston carrying a yieldable facing adapted to engage said seat, a by-pass around the piston, a needle valve screwed in said other end of the cylinder controlling said by-pass, the stem of the needle valve extending across the opening into the cylinder at this end, and a spring latch carried by the piston adapted to engage said stem when the piston engages said seat.

4. A fluid flow controlling device including a cylinder adapted to be inserted in a piping system for conveying fluid, said cylinder being provided with pipe connections at its two ends respectively, a valve member adapted to reciprocate in said cylinder and to close one of said pipe connections upon the occurrence of a predetermined flow of fluid in said system, and means for locking the piston in such position, said means comprising a threaded member adapted to be screwed through an opening in said cylinder at one end thereof and an element carried by said valve member and adapted to engage said threaded member.

5. A fluid flow controlling device including a cylinder adapted to be inserted in a piping system for conveying fluid, said cylinder being provided with pipe connections at its two ends respectively, a valve member adapted to reciprocate in said cylinder and to close one of said pipe connections upon the occurrence of a predetermined flow of fluid in said system, a drain or relief opening in said cylinder, a plug adapted to be inserted within said opening, and an element carried by said valve member and adapted to engage a portion of said plug, whereby said valve member may be retained in said closed position.

6. A fluid flow controlling device including a cylinder adapted to be inserted in a piping system for conveying fluid, said cylinder being provided with pipe connections at its two ends respectively, a valve member adapted to reciprocate in said cylinder and to close one of said pipe connections upon the occurrence of a predetermined flow of fluid in said system, a restricted portion at one end of said cylinder, a retaining member adapted to be removably disposed within said restricted portion, and an element carried by said valve member and adapted to extend into said restricted portion and to engage said retaining member to lock said valve member in said closed position.

7. A fluid flow controlling device including a cylinder adapted to be inserted in a piping system for conveying fluid, said cylinder being provided with pipe connections at its two ends respectively, a valve member adapted to reciprocate in said cylinder and to close one of said pipe connections upon the occurrence of a predetermined flow of fluid in said system, a by-pass conduit adapted to afford communication between the end portions of said cylinder around said valve, a drain or relief opening in said cylinder in the vicinity of one end of said by-pass conduit, a plug adapted to close said opening and having a portion adapted to control the flow through said by-pass, and an element on said valve member adapted to engage a portion of said plug to retain said valve in said closed position.

8. A fluid flow controlling device including a cylinder adapted to be inserted in a piping system for conveying fluid, said cylinder being provided with pipe connections at its two ends respectively, a valve member adapted to reciprocate in said cylinder and to close one of said pipe connections upon the occurrence of a predetermined flow of fluid in said system, an equalizing by-pass conduit adapted to afford communication between the end portions of said cylinder around said valve, an adjustable member adapted to control the flow through said by-pass and an element carried by said valve member adapted to engage said adjustable member to lock said valve member in closed position, means for actuating said adjustable member to release said valve member and to simultaneously open said equalizing by-pass.

In testimony whereof I hereunto affix my signature.

JAMES Q. DU PONT.